US005793195A

United States Patent [19]
Kaufman et al.

[11] Patent Number: 5,793,195

[45] Date of Patent: Aug. 11, 1998

[54] ANGULAR DISTRIBUTION PROBE

[75] Inventors: Harold R. Kaufman, Laporte; Raymond S. Robinson; James R. Kahn, both of Fort Collins, all of Colo.

[73] Assignee: Kaufman & Robinson, Inc., Ft. Collins, Colo.

[21] Appl. No.: 521,349

[22] Filed: Aug. 30, 1995

[51] Int. Cl.[6] .................... G01N 27/62

[52] U.S. Cl. .................... 324/71.3; 324/459; 313/359.1

[58] Field of Search .................... 324/459, 71.1, 324/71.3; 313/359.1, 361.1, 363.1

[56] References Cited

U.S. PATENT DOCUMENTS

| | | | |
|---|---|---|---|
| 4,358,338 | 11/1982 | Downey et al. | 324/71.3 X |
| 4,686,022 | 8/1987 | Rempt | 313/359.1 X |
| 4,862,032 | 8/1989 | Kaufman et al. | 313/359.1 |
| 5,459,393 | 10/1995 | Tanaka et al. | 324/71.3 |
| 5,554,926 | 9/1996 | Elmer et al. | 324/71.3 |

OTHER PUBLICATIONS

AIAA Journal "Ion Source Design for Industrial Applications,", vol. 20, No. 6, pp. 745–760, Kaufman et al, Jun. 1982.

"Operation of Broad–Beam Sources", pp. 99–102–Kaufman et al, 1984 (month unavailable).

"Divergence measurements for characterization of the micropatterning quality of broad ion beams," Journal Of Vacuum Science and Technology, vol. A8, No. 6, pp. 4001–4010, Huth et al, Nov./Dec. 1990.

"Discharge–Chamber Sputtering Investigation", Nov. 1976, pp. 1–8, AIAA Paper, No. 76–1026—Williamson et al.

AIAA Journal, vol. 17, No. 1 pp. 64–70–Kaufman et al, Jan. 1979, "Ion Beam Divergence Characteristics of Three–Grid Accelerator Systems".

Ion Beam –AIAA vol. 16, No. 5 pp. 516–524—Kaufman et al, May 1978, "Ion Beam Divergence Characteristics of Two–Grid Accelerator Systems".

*Primary Examiner*—Kenneth A. Wieder
*Assistant Examiner*—Glenn W. Brown
*Attorney, Agent, or Firm*—Hugh Drake; Dean P. Edmundson

[57] ABSTRACT

Ion-beam probes of the planar, screened, and multilayer types are shown and described. These probes can detect the arrival of energetic ions and, in the latter type, also detect the arrival of energetic neutral molecules. A specific improvement is the use of a multilayer collection surface behind an aperture to measure the angular distribution of the etching contributions of energetic ions and/or energetic neutral molecules. After use, this multilayer collection surface provides a permanent record of the measurement. The improvement is also suitable for the adverse thermal and ion-etching environment of an energetic ion beam. In one embodiment, the aperture size and distance from the collection surface are such that a theoretical analysis of etch depth behind a straight-edge mask can be used to analyze the experimental results. The etch contour can be accurately reproduced from the measurement of half-maximum half angle, as long as the assumed distribution is incorporated in the measurement process.

12 Claims, 8 Drawing Sheets

ANGULAR DISTRIBUTION PROBE

FIELD OF INVENTION

This invention relates generally to ion and plasma technology. More particularly it pertains to probes used to measure the arrival and angular distributions of energetic molecules, both ionized and neutral, and especially the angular distribution of actual etching capability of the energetic neutrals.

The invention can find application in industrial processes such as sputter etching, sputter deposition, coating and property enhancement. It can also find application in electric space propulsion.

BACKGROUND ART

Beams of energetic ions have been generated with the ions produced by the removal of electrons from molecules, usually one electron per molecule. Such beams are used in a variety of industrial applications as well as in electric space propulsion. The ion sources used to generate these energetic ion beams are mostly gridded, in that they use the electrostatic field between closely spaced grids to accelerate the ions. A review of the technology of gridded ion sources is presented by Kaufman et al. in *AIAA Journal*, Vol. 20, No. 6, beginning on page 745. The sources generating the energetic ion beams can also be gridless, in that the ions are accelerated by the electric field that results from an electron current interacting with a magnetic field. One example of the latter type of ion source is shown in U.S. Pat. No. 4,862,032—Kaufman et al.

Although the molecules in the beams generated by these ion sources are initially ionized, charge exchange after acceleration also results in the formation of energetic neutral molecules, hereinafter referred to as energetic neutrals. In the charge-exchange process, an electron leaves a low-energy background neutral and becomes attached to the energetic ion, resulting in the formation of a low-energy ion and an energetic neutral. The low-energy ion has little or no sputter erosion or etching capability, but it may be collected by a probe that depends on electrical detection. On the other hand, the energetic neutral is not detected by a probe that depends on electrical detection, but it usually has about the same etching capability as the energetic ion had before charge exchange. It should be noted that, for similar species of ions and background neutrals (resonant charge exchange), the cross section for charge exchange can be ten to twenty times as large as the cross section for momentum loss at ion-beam energies. This means that a large fraction of the ion beam can be charge exchanged to energetic neutrals before substantial momentum loss will occur. At the usual pressures at which ion sources are operated, charge exchange is more of a concern than momentum loss.

It should also be mentioned that the low-energy charge-exchange ions flow outward from the ion beam to fill the surrounding vacuum chamber. Further, there must also be sufficient electrons present to balance the positive charges of both the energetic and low-energy ions. The resultant mixture of electrons and ions constitutes an electrically conductive gas, or plasma.

Several different types of probes have been used to measure the distributions of ions in energetic ion beams. The most common probes have been planar probes and screened probes, as described by Kaufman et al. in *Operation of Broad-Beam Sources* (Commonwealth Scientific Corporation, Alexandria, Va., 1987), pp.99–102. Both of these probes measure the arrival of ions and do so with electrical measurements.

The planar probe uses a negatively biased collection surface and detects both energetic ions and low-energy charge-exchange ions, without discriminating between the two. It also has a small (about 10 percent) systematic error due to the escape of secondary electrons that are generated by the collisions of the ions with the collection surface. The screened probe uses a negatively biased screen to reflect electrons and a positively biased collection surface that collects energetic ions but not low-energy ions. Because both of these probes depend on electrical detection, neither of them detects energetic neutrals.

If the energetic ion beam is generated by a gridded ion source, the ion-beam current at the source is known. The ion beam can then be surveyed in a plane transverse to the ion motion by the translation of a screened probe, which detects only energetic ions. Using numerical integration, the ion-beam current can be calculated from the survey. The ion-beam current obtained by numerical integration can then be compared to the ion-beam current at the source to estimate the fraction of energetic ions that must have undergone charge exchange.

If the ion source is of the gridless type, there is no accurate indication of the ion-beam current at the source, and it is more difficult to numerically estimate the fraction of the beam that is composed of energetic neutrals.

A more complicated probe has been used not just to detect the arrival of energetic ions but to also indicate the incidence angle (or angular distribution) of these ions at the probe. An example of such a probe is described by Huth et al., in *Journal of Vacuum Science and Technology*, Vol. A8, No. 6, beginning on p. 4001. To obtain an angular resolution that is small compared to the angular distribution, the electrical signal level is typically in the range of picoamperes, which is a difficult signal level to measure in the environment in which ion sources operate. Energetic neutrals are also not detected with this type of probe.

Although not widely used, there is another type of probe that detects the arrival of both energetic ions and energetic neutrals. As described by Williamson, et al, *AIAA Paper*, No. 76-1026, this probe is made by depositing very thin alternating layers of metals with contrasting colors upon a substrate. The depth of etching that results from exposure to energetic ions and neutrals is measured by counting the layers that have been etched through. Because an etching measurement is used, the effects of both energetic ions and energetic neutrals are included. By using layer thicknesses of 200 to 1000 Angstroms in thickness, short exposures can be used to measure the etch depths.

Recent industrial etching applications have become increasingly demanding due to the requirement for etch depths of slots that are several or more times the widths of the slots. To reach the bottoms of such slots, it is necessary to have ion beams that are well collimated. That is, ion beams that arrive at the etching target with an angular distribution of only several degrees. With the limited capabilities of existing probes, it is difficult to evaluate the angular distributions within the beams of energetic ions and neutrals that are generated by existing ion sources. In addition, it is difficult to determine when a reduction in angular distribution has been obtained.

Further, the heating and etching in an energetic ion beam make that environment a difficult one in which to maintain a probe against electrical and physical degradation, particularly a probe that requires the measurement of picoampere electrical signals.

SUMMARY OF INVENTION

In the light of the foregoing, it is an overall general object of the present invention to provide an improved angular distribution probe for use in energetic ion beams.

It is a further general overall object of the invention to provide for the measurement of the angular distribution of the etching contributions of both the energetic ions and the energetic neutrals that result from the charge-exchange of energetic ions.

It is another general overall object of the invention to provide an improved probe which accomplishes the angular distribution measurement that is simple, rugged, and suited to the adverse thermal and etching environment of an energetic ion beam.

A more specific object of the present invention is to provide a probe which generates a permanent record of the angular distribution measurement.

Another more specific object of the present invention is to provide an improved probe which accomplishes the angular distribution measurement without the use of use of very low levels of electrical signals.

In accordance with one specific embodiment of the present invention, the angular distribution probe takes a form that includes a multilayer collection surface, located behind a mask with a circular aperture, which provides the controlled admission of energetic ions and neutrals. The diameter of the aperture is sufficiently large compared to the distance of the aperture from the collection surface so that, for the angular distribution being measured, the center of the multilayer collection surface is unshadowed (exposed to the full angular distribution of the energetic ions and neutrals). This relationship between aperture diameter and distance to the collections surface is sufficient to permit the measurement of the angular distribution. The results of this measurement are normally given in a half-maximum half angle, which is a commonly used measure of angular distribution. To show the internal consistency of the measurement procedure, the half-maximum half angle that is obtained can be used to reproduce the etch contour. This reproduction is insensitive to the exact radial distribution assumed, as long as the assumed radial distribution is incorporated in the procedure for the half-maximum half-angle measurement.

DESCRIPTION OF FIGURES

The features of the present invention which are believed to be patentable are set forth with particularity in the appended claims. The organization and manner of operation of the invention, together with further objectives and advantages thereof, may be understood by reference to the following descriptions of specific embodiments thereof taken in connection with the accompanying drawings, in the several figures of which like reference numerals identify like elements, and in which:

It may be noted that the aforesaid schematic cross-sectional views represent the surfaces in the plane of the section, while avoiding the clutter that would result were there also a showing of the background edges and surfaces of the overall assemblies.

DESCRIPTION OF PRIOR ART

Figure 1:
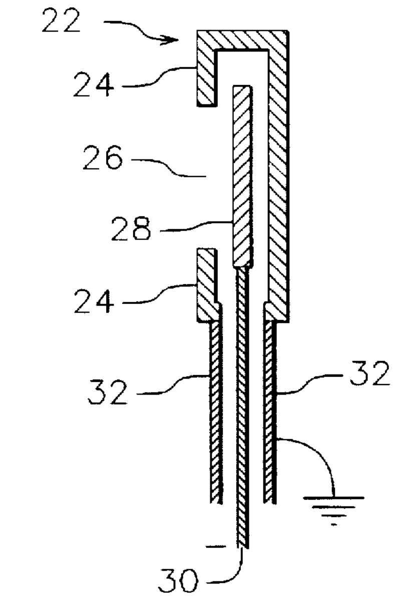
(PRIOR ART) Fig. 1
FIG. 1 is a schematic cross-sectional view of a prior-art planar type of ion probe.

Referring now to FIG. 1, there is shown an ion probe 22 of the prior art, more particularly one of the planar type. The probe body 24 has an aperture 26 through which the ions (not shown) can reach the collection surface 28. The area of aperture 26 defines the effective collection area for the probe. The ions are assumed to move generally from the left to the right in this figure. Collection surface 28 is electrically connected to the negative terminal of an electrical power source (not shown) through a conductor 30, which is separated from the surrounding grounded shield 32. Grounded shield 32 also serves to electrically connect probe body 24 to ground and the positive terminal of the electrical power source. Probe body 24 and grounded shield 32 also serve to prevent ions from reaching collection surface 28 except through aperture 26. The typical potential of the collection surface 28 is −20 to −30 V, which is sufficient to reflect electrons from the surrounding plasma.

The planar probe of FIG. 1 has the advantage of simplicity, but it has several shortcomings. As described above, the passage of energetic ions through the background gas results in charge exchange between the energetic ions and the background neutral molecules. Low-energy charge-exchange ions are collected along with the energetic beam ions and the probe cannot distinguish between the two types of ions. In addition, the probe cannot detect energetic neutrals, which are also important for etching. Some of the ions that strike collection surface 28 also emit low-energy secondary electrons. For argon and most probe materials, roughly 10 percent of the collected ions emit secondary electrons. With the probe biased negative of ground and the surrounding plasma, the secondary electrons leave the collection surface and enter the surrounding plasma, with each departing electron giving the same electrical signal as an arriving ion.

Figure 2:
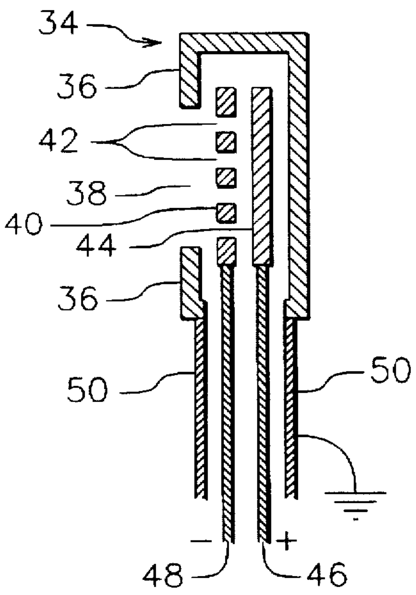
(PRIOR ART) Fig. 2
FIG. 2 is a schematic cross-sectional view of a prior-art screened type of ion probe.

FIG. 2 represents another prior-art probe 34, more particularly one of the screened type. The probe body 36 has an aperture 38 through which the ions (not shown) can reach the screen 40 and, passing through the plurality of screen apertures 42, reach the collection surface 44. The total area of screen apertures 42 defines the effective collection area for the probe. The ions are again assumed to move generally from the left to the right in this figure. Collection surface 44 is electrically connected to the positive terminal of an electrical power source (not shown) through a conductor 46, and screen 40 is connected to the negative terminal of another electrical power source (also not shown) through a conductor 48, both of which are separated from the surrounding grounded shield 50. Grounded shield 50 also serves to electrically connect probe body 36 to ground and the opposite terminals of the two electrical power sources. Probe body 36 and grounded shield 50 also serve to prevent ions from reaching collection surface 44 except through screen apertures 42.

The typical potential of screen 40 is −20 to −30 V, while that of collection surface 44 is +20 to +30 V. The negative screen potential is sufficient to reflect electrons from the surrounding plasma, while the positive collection-surface potential is sufficient to reflect low-energy charge-exchange ions and to collect the secondary electrons that result from collisions of energetic ions with the collection surface.

The screened probe of FIG. 2 is more complicated, but it avoids some shortcomings of the planar probe. Low-energy charge-exchange ions are reflected by the positive collection surface 44, so that only energetic ions are detected. The systematic error of secondary electrons is also avoided by the positive potential of collection surface 44. As a shortcoming, the screened probe, like the planar probe, cannot detect energetic neutrals.

Figure 3:
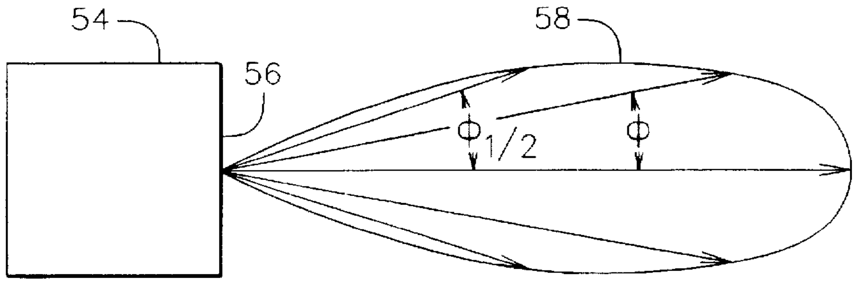
(PRIOR ART) Fig. 3
FIG. 3 is a schematic representation of an ion source with single-aperture ion optics and the angular distribution of the ions leaving that source.

Referring now to FIG. 3, a single-aperture ion source together with the angular distribution of energetic ions from that source is indicated. The ions are again assumed to move in the general direction from the left to the right. The ion source 54 has a single aperture (not shown) in the right side 56 of the source. The aperture is assumed small compared to the size of source 54, so that the ions in FIG. 3 appear to effectively originate at a point and have angular distribution 58. The angle relative to the direction of maximum intensity is defined as $\phi$, while the length of the arrows from the effective point of origination indicates the solid-angle current intensity (A/steradian). The angle $\phi_{1/2}$ is the angle at which the ion intensity falls to half the maximum value. The latter is called the half-maximum half-angle, and is frequently used as a defining parameter for an angular distribution of energetic ions.

A typical industrial ion source has a array of ion-optics apertures, resulting in many distributions such as that shown in FIG. 3 overlapping one another in the ion-beam region. The angular distribution from a small array of holes has been studied in scientific investigations using probes of the type shown in FIG. 2, by making the distance from the array of holes very large compared to the size of the array. An example of such an investigation is Aston, et al., *AIAA Journal*, Vol. 16, No. 5, beginning on p. 516.

Figure 4:
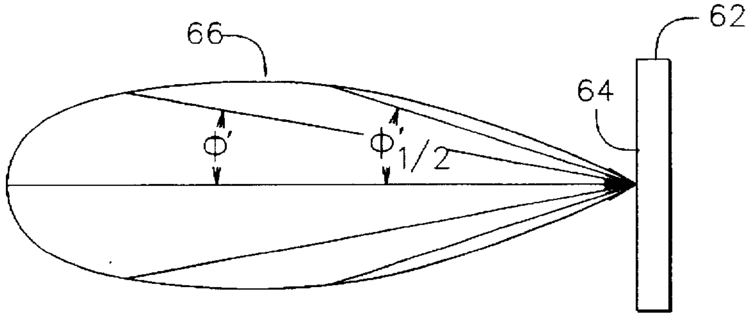
(PRIOR ART) Fig. 4
FIG. 4 is a schematic representation of an etching target and the angular distribution of the ions arriving at a small area on that target.

In FIG. 4, the angular distribution of energetic ions arriving at a small target area is indicated. The ions move in the general direction of left to right and strike target 62, or more specifically a small area on the left surface 64 of target 62. These ions have an angular distribution 66. The angle relative to the direction of maximum intensity is defined as $\phi'$, while the length of the arrows again indicates the solid-angle current intensity (A/steradian). The angular distribution 66 is similar to what might be expected from a multiaperture ion source, where the size of the distribution of apertures is substantial compared with the source-target distance.

There is a half-maximum half angle $\phi'_{1/2}$ for the ions arriving at the target. Although $\phi$ and $\phi_{1/2}$ (from FIG. 3) are geometrically related to $\phi'$ and $\phi'_{1/2}$ in FIG. 4 through the spatial distribution of ion-source apertures, the angular distribution at the target is defined more precisely when it can be measured directly, rather than be inferred from the angular and spatial distribution of ions leaving the ion source. The planar and screened ion probes (FIGS. 1 and 2) cannot be used to determine the arrival distribution at the target in FIG. 4, because the size of the array of ion-source apertures is substantial compared to the source-target distance, and those types of probes cannot distinguish between ions arriving at angles that differ by only several degrees.

Figure 5:
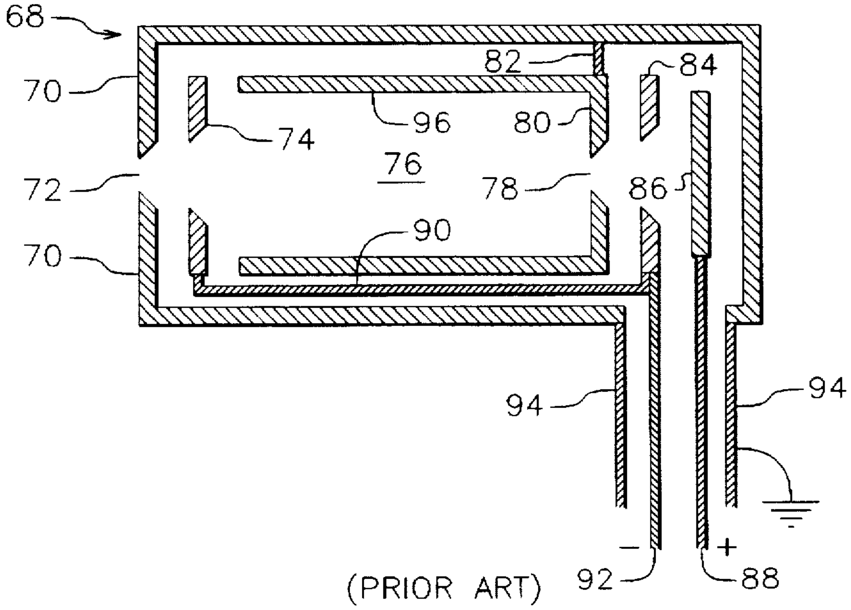
(PRIOR ART) Fig. 5
FIG. 5 is a schematic cross-sectional view of a prior-art angular-distribution ion probe.

FIG. 5 depicts a prior art angular distribution probe 68. The following description differs in detail, but generally follows the description of the aforementioned article by Huth et al., in *Journal of Vacuum Science and Technology*, Vol. A8, No. 6, beginning on p. 4001. The body 70 of the probe has an aperture 72 at one end. Inside of aperture 72 is an electron screen 74 beyond which is a drift region 76, a second aperture 78 which is located in a plate 80 which, in turn, is connected by a conductor 82 to probe body 70. Beyond the second aperture 78 is a second screen 84 and an ion collection surface 86. Ion collection surface 86 is electrically connected to the positive terminal of an electrical power source (not shown) through a conductor 88. Screens 74 and 84 are connected together by conductor 90 and are then connected to the negative terminal of a second electrical power supply through a conductor 92. Both conductors 88 and 92 are separated from a surrounding grounded shield 94 which also serves to electrically connect probe body 70 to ground and to the opposite terminals of the two power supplies. A cylindrical extension 96 of plate 80 serves to provide a grounded potential boundary to drift region 76, shielding that region from other electrical influences such as from conductor 90. The ions arrive from the general direction of the left and must pass through apertures 72 and 78 to reach the ion collection surface 86. Screen 74 prevents electrons from the plasma surrounding the probe 68 from reaching ion collection surface 86. Screen 84 prevents secondary electrons emitted within probe 68 from reaching ion collection surface 86.

The current to ion collection surface 86 and conductor 88 is a measure of the solid-angle ion current intensity (A/steradian) for the direction in which the apertures 74 and 78 are aligned. For an angular resolution of ±½ degree, a length between apertures 74 and 86 of several centimeters, and a current density of 1 mA/cm$^2$, the current is of the order of picoamperes. Such low signal levels are difficult to measure with cables that are also exposed to the background plasma or varying magnetic fields in a typical ion-source installation. Further, to use probe 68 to make a measurement of the angular distribution of ions at a target location, it is necessary to survey the solid-angle from which ions arrive at that target location using mechanical actuators for angular motion in two directions. From the viewpoint of the user, then, the type of probe shown in FIG. 5 is complicated in construction, depends on the measurement of very low currents, and requires complicated mechanical actuators, all in the adverse environment of an ion beam. In addition, this type of probe does not detect energetic neutrals.

Figure 6:
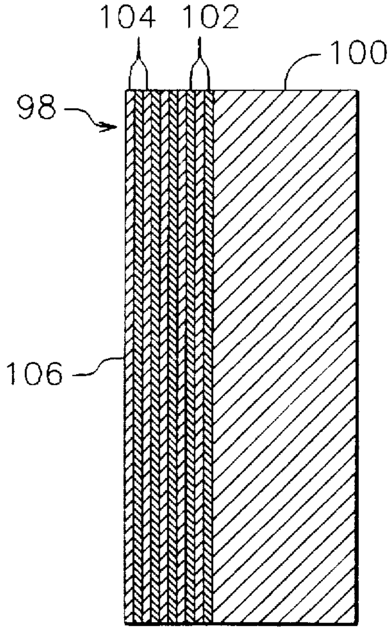
(PRIOR ART) Fig. 6
FIG. 6 is a cross-sectional view of a prior-art multilayer probe.

FIG. 6 illustrates an alternative prior-art probe 98 which uses a multilayer structure for measuring the arrival of energetic ions and neutrals. There is a supporting substrate 100 upon which have been deposited alternating layers of metals 102 and 104 that contrast in color, usually copper and tantalum or copper and molybdenum. The surface 106 of probe 98 is exposed to energetic ions and neutrals when the probe is used. The copper is desirable to show a contrasting color from most other metals, while tantalum or molybdenum is desirable to have a refractory metal that is resistant to diffusion at the elevated temperatures at which these probes often operate. All the copper layers have the same thickness and all the tantalum or molybdenum layers have the same thickness. The copper layers may have the same thickness as the tantalum or molybdenum layers, or they may be slightly different to compensate for the different etch rates of the two materials. The layer thickness is greatly exaggerated in this figure, in that each layer is typically only 200 to 1000 Angstroms thick. A total of ten or twenty layers would thus have a overall thickness of a couple of microns, or less.

Figure 7:
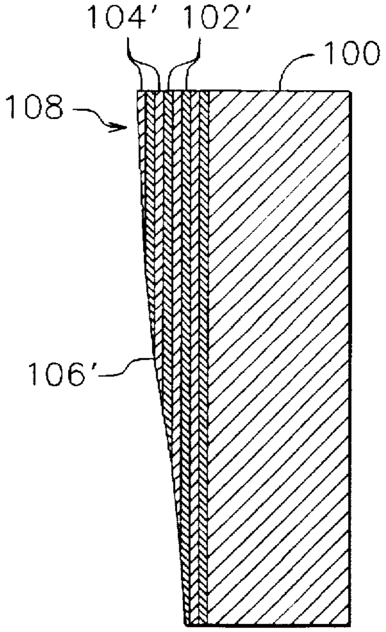
(PRIOR ART) Fig. 7
FIG. 7 is a cross-sectional view of the prior-art multilayer probe shown in FIG. 6 after exposure to energetic ions and neutrals.

FIG. 7 shows a probe 108 similar to the one in FIG. 6 but after exposure to energetic ions and neutrals, which move from left to right, striking surface 106' and causing the etching shown by the difference between surface 106' and surface 106 in FIG. 6. The change in the surface 106' corresponds to the removal of part or all of alternating layers 102' and 104'.

Figure 8:
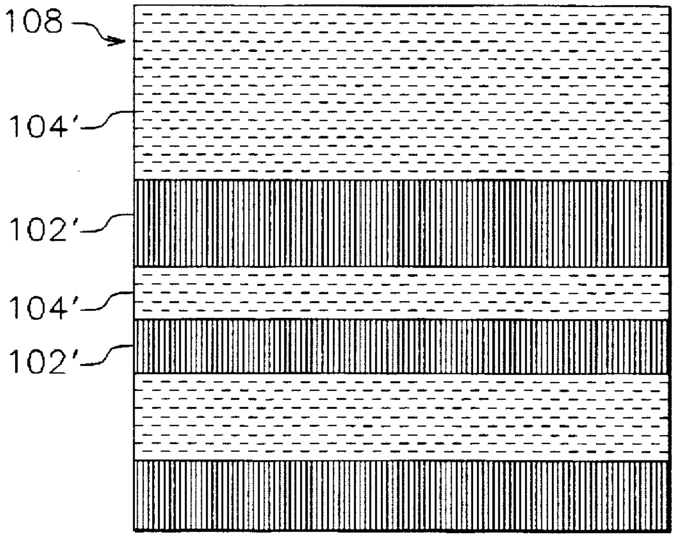
(PRIOR ART) Fig. 8
FIG. 8 is a plan view of the etched surface of the prior-art multilayer probe shown in FIG. 7.

FIG. 8 depicts the same probe as shown in FIG. 7, except the view is normal to the etched surface 106'. The etched layers 102' and 104' are, as mentioned above, extremely thin, and therefore difficult to measure when viewed from the side. When the etched surface is viewed as shown in FIG. 8, however, the removal of layers is visible with the unaided eye or with low-power magnification. The copper layers exhibit a reddish color and the molybdenum or tantalum layers exhibit a silvery color. If the illumination is adjusted to maximize contrast, excellent contrast can be obtained between the two metals in the alternating layers. If one part of the layered surface was protected, the etch depth may be determined by counting the alternating layers from the protected region. If no part of the sample was protected, a separate and deeper etching of a small area may be used to determine the number of remaining layers. In FIG. 8, the arrival of energetic ions and neutrals is a function only of vertical height and increases from the top to the bottom of the etched surface 106'. More complicated arrival distributions will result in more complicated color patterns.

The measurement of the arrival of energetic ions and neutrals by the multilayer probe shown in FIGS. 6, 7, and 8 is by the time integrated etching of the layered surface. For a steady arrival rate, the rate is calculated from the integrated etching and the exposure time. A rough calculation can be made from the metals used and etched thicknesses. The transition from one metal to another tends to generate texturing, which can slow the overall etching rate. A more precise etch calculation should therefore be based on previous etching tests with known arrival rates of energetic ions and neutrals. This multilayer probe does not require electrical measurements and is well suited to the adverse environment of an ion beam. This type of probe also has an advantage over probes that use electrical measurements in that it measures the arrival of energetic neutrals as well as energetic ions. However, it does not measure the angular distributions of either energetic ions or energetic neutrals.

DESCRIPTION OF THE PREFERRED EMBODIMENTS

Figure 9:
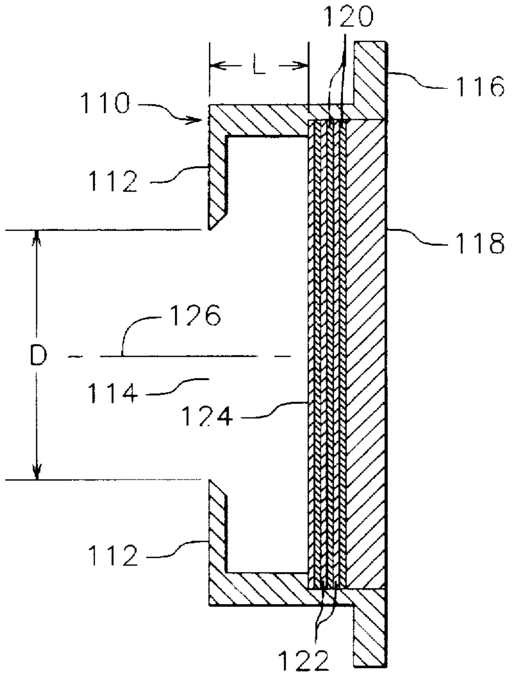
FIG. 9 is a schematic cross-sectional view of an angular-distribution probe constructed in accordance with one specific embodiment of the present invention.

FIG. 9 sets forth an axisymmetric angular distribution probe 110 that embodies the improvements of the present invention. The probe 110 includes a body 112 which has a centrally located circular aperture 114, a mounting flange 116 and a circular substrate 118 upon which have been deposited alternating layers of metals 120 and 122 contrasting in color as, for example, copper and molybdenum. The diameter D of aperture 114 should be large compared to the distance L from aperture 114 to ion collection surface 124, with the size relationship defined more precisely below. Layers 120 and 122 are again microscopic in thickness, with layers 120 all the same size and layers 122 all the same size and each typically 200 to 1000 Angstroms in thickness. Probe 110 has an axis of symmetry 126.

Figure 10:
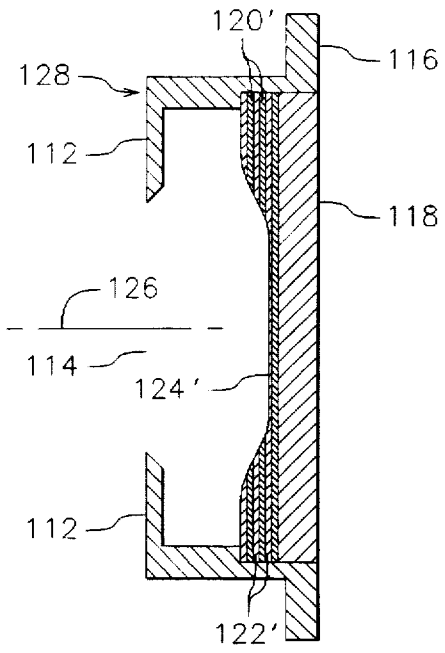
FIG. 10 is a schematic cross-sectional view of the angular-distribution probe shown in FIG. 9 after exposure to energetic ions and neutrals.

FIG. 10 shows probe 128, which is the same probe as shown in FIG. 9 except that it has been exposed to energetic ions and neutrals which have moved generally from left to right, striking surface 124' and causing the etching shown by the difference between surface 124' and surface 124 in FIG. 9. The change in the surface 124' corresponds to the removal of part or all of alternating layers 120' and 122'.

Figure 11:
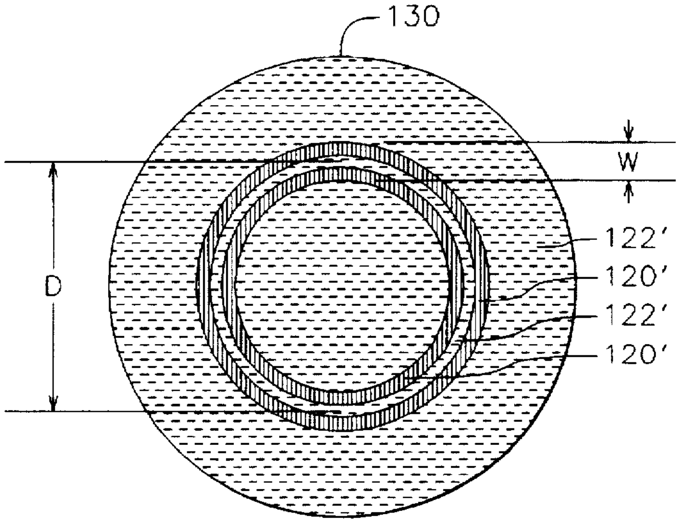
FIG. 11 is a plan view of the etched collection surface of the probe shown in FIG. 10.

In FIG. 11 is shown the outline 130 of the circular substrate 118 and the partially etched layers of contrasting metals 120' and 122' which are located upon the substrate. The view in this figure differs from that in FIG. 10 in that it is normal to the etched surface 124'. The etched layers 120' and 122' are, as mentioned above, extremely thin and therefore difficult to measure when viewed from the side. When the etched surface is viewed as shown in FIG. 11, however, the removal of layers is visible with the unaided eye or with low-power magnification. The diameter D in FIG. 9 is also equal to the mean diameter of that part of the etch pattern of surface 124' shown in FIG. 11 where the depth is varying rapidly. The central circular region (silver in FIG. 11) should be one color because this region is unshadowed. If this region were not one color and the layers were initially deposited uniformly, the ion-current density (A/cm$^2$) would have to be changing over the region sampled, and a smaller probe should be used to reduce the effect of current density variation. With axisymmetric construction of the probe, the displacement of the center of the etch pattern from the geometric center of the outside edge 130 shows the mean angular displacement of the angular distribution of the arriving energetic ions and neutrals from the axis of symmetry. (More precisely, the mean angular displacement in FIG. 11 from the normal is the arc tan (d/L), where d is the displacement of the center of the etch pattern from the geometric center of the outside edge 130. For a value of L equal to 14.3 mm and small departures from a normal incidence, for example, each mm of displacement of the etch pattern will correspond to about 4 degrees of displacement of the center of the angular distribution.)

The description of the theory will be given below, but it should be evident that the width W of the etch pattern in FIG. 11 is related to the half-maximum half angle $\phi'_{1/2}$ for the energetic ions and neutrals arriving at probe 128. (The half-maximum half angle $\phi'_{1/2}$ is used here in the same way as it was described in FIG. 4, except that probe 128 in FIG. 10 is used in place of target 62 in FIG. 4.) Using first a simplified approach, the diameter D should be large compared to the width W in FIG. 11 for the analysis to be approximated with the etching behind a straight-edge mask. (This theory is discussed in detail below.) The dimension L in FIG. 9 should be small enough to assure that W in FIG. 11 is small compared to D. Using this approach, the accuracy should be sufficient for most angular-distribution measurements if D is ten times larger than W.

Figure 12:
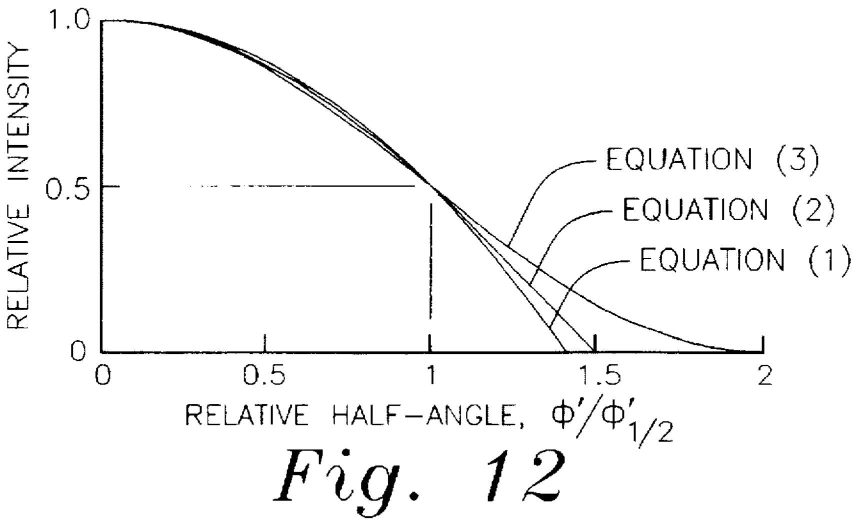
FIG. 12 depicts three radial angular distributions of energetic ion or neutral intensity.

The theory used in calculations of half-maximum half angle $\phi'_{1/2}$ for the energetic ions and neutrals arriving at the probe 128 can be understood by referring to FIG. 12, where typical angular distributions for energetic ions and neutrals are indicated. With "relative intensity" in FIG. 12 defined as $j/j_{max}$, the equations for these curves are:

$$j/j_{max}=1-(\phi'/\phi'_{1/2})^2/2, \tag{1}$$

$$j/j_{max}=\cos(\pi\phi'/3\phi'_{1/2}), \tag{2}$$

$$j/j_{max}=[1+\cos(\pi\phi'/2\phi'_{1/2})]/2, \tag{3}$$

where j is the current intensity (A/steradian, or, in the case of energetic neutrals, equivalent-A/steradian, where the equivalent current is the current that would be measured if each neutral molecule carried one electronic charge), and $j_{max}$ is the maximum value of j, and $\phi'$ is the angle relative to the direction of maximum intensity.

The distributions of EQS. (1), (2), and (3) are most appropriate (with the substitution of $\phi$ and $\phi_{1/2}$ for $\phi'$ and $\phi'_{1/2}$) for the distributions from ion sources at normal operating conditions (FIG. 3), because most of the studies of angular distributions were for ions leaving such sources — see Aston, et al., *AIAA Journal*, Vol. 17, No. 1, beginning on p. 64, as well as the aforementioned article by Aston, et al., *AIAA Journal*, Vol. 16, No. 5, beginning on p. 516. The distributions of EQS. (1), (2), and (3) are less documented for use as ion arrival distributions at the target (FIG. 4), inasmuch as the aforementioned article by Huth et al., in *Journal of Vacuum Science and Technology*, Vol. A8, No. 6, beginning on p. 4001, is the only study found of arrival distributions. As will be shown for the embodiment of FIGS. 9 and 10, though, the exact choice of distribution shape is not important.

It should be emphasized that the distributions in FIG. 12 are for gridded ion sources operating in normal operating regimes, between about half maximum and the maximum ion current possible for the screen and accelerator voltages that are being used. Operation at only a small fraction of this maximum beam current can result in substantially different distributions.

Figure 13:
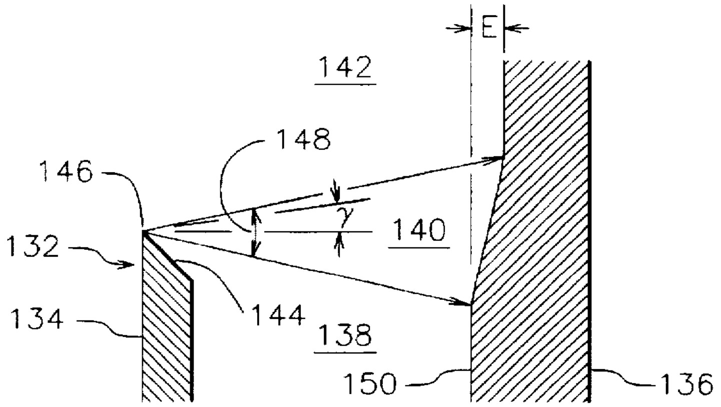
FIG. 13 is a partial cross-sectional view of the etching behind a straight-edge mask.

Referring now to FIG. 13, the simplified etching model 132 with a straight-edge mask is indicated therein, with the energetic ions and neutrals again moving from the left to the right. The straight-edge mask 134 intercepts some of the energetic ions and neutrals moving toward the element 136 that is etched. This interception results in a region of total shadow 138, a region of partial shadow 140, and an unshadowed region 142 (a region of full exposure). The mask 134 has a bevel 144 that results in a sharp, well-defined edge 146. That edge and the full angular range 148 of arriving ions and neutrals defines the extent of the different regions 138, 140, and 142. After exposure to energetic ions and neutrals, the originally flat surface 150 is etched to a range of depth, zero in the shadowed region 138, of varying depth in the partially shadowed region 140, and of constant depth at the maximum value of E in the unshadowed region 142. (The etch depth in FIG. 13 is exaggerated for visual clarity and would be invisible if drawn to scale.)

Figure 14:
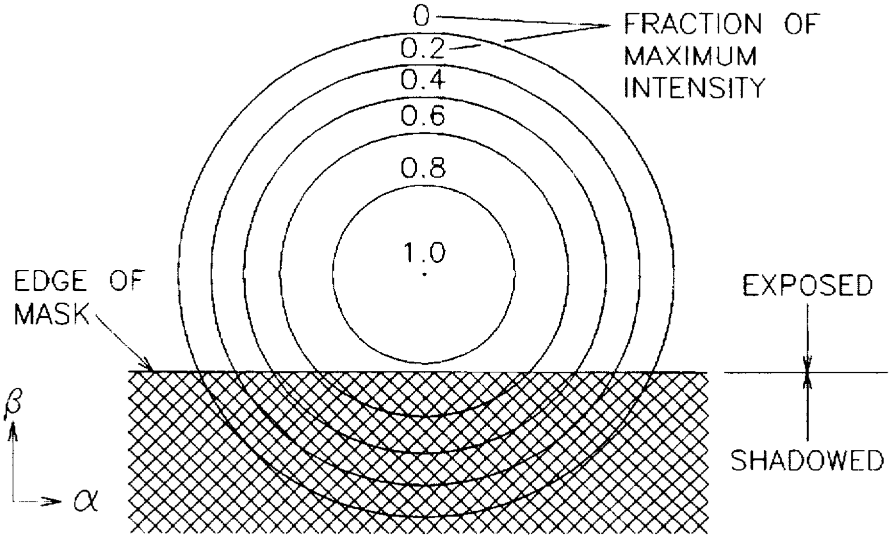
FIG. 14 depicts the angular distribution of energetic ions or neutrals arriving at a small target area in the partially shadowed region of FIG. 13.

The nature of the calculation required for the etch contour of surface 150 in FIG. 13 is indicated in FIG. 14. The angular variation of intensity with $\phi'$ for EQS. (1), (2), or (3) is resolved in terms of angles $\alpha$ and $\beta$, parallel and normal to the edge of the mask, respectively. The angular variation appears in FIG. 14 as circular contours of constant fractions of maximum intensity. The etch depth at a point in the partially shadowed region 140 of FIG. 13 is obtained by integrating the portion of the angular distribution not shadowed by the mask. As the location in the partially shadowed region 140 approaches the shadowed region 138, the fraction of the distribution intercepted by the mask increases and the etch depth decreases.

Figure 15:
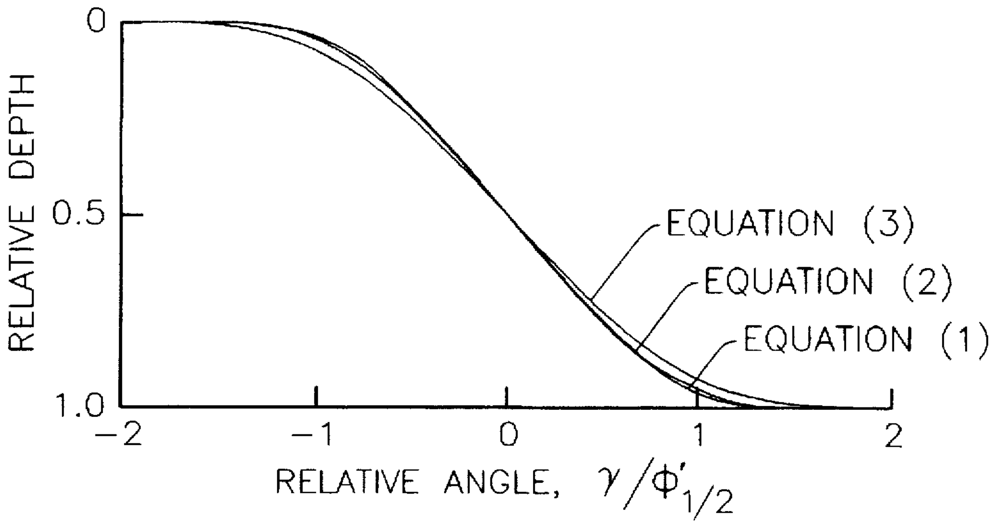
FIG. 15 depicts the etch contours that would be obtained using the etching configuration of FIG. 13 when the energetic ions or neutrals have the three different radial angular distributions shown in FIG. 12.

The shape of the etch contours in the configuration of FIG. 13, using the calculation procedure outlined in connection with FIG. 14, are indicated in FIG. 15. The shapes of the etch profiles are shown from the fully shadowed region at the left in FIG. 15 to the unshadowed region at the right for the three different angular distributions of EQS. (1), (2), and (3). (These three distributions are also indicated in FIG. 12.) The distance along the surface 150 in FIG. 13 is expressed as a relative angle $\gamma/\phi'_{1/2}$ along the abscissa of FIG. 15. (The angle $\gamma$ is also shown in FIG. 14 and is zero directly behind the edge 146 of the mask 134, where the etch depth is half the maximum value and increases in the direction toward the unshadowed region 142.) In plotting against relative angle $\gamma/\phi'_{1/2}$ in FIG. 15, the curves for EQS. (1), (2), and (3) are, in effect, compared for the same value of half-maximum half angle $\phi'_{1/2}$ The contour for EQ. (3) has a lower slope and extends out to $\gamma/\phi'_{1/2}=\pm 2$ before reaching an etch depth of zero (no etching) or 1.0 (the maximum depth). Comparison with the angular distributions in FIG. 12 shows that EQ. (3) has the greatest radial extent, extending out to twice $\phi'_{1/2}$ Although the difference is small between EQS. (1), (2), and (3) in FIG. 15, EQ. (1) has the smallest radial extent in FIG. 12 and the steepest slope in FIG. 15.

Figure 16:
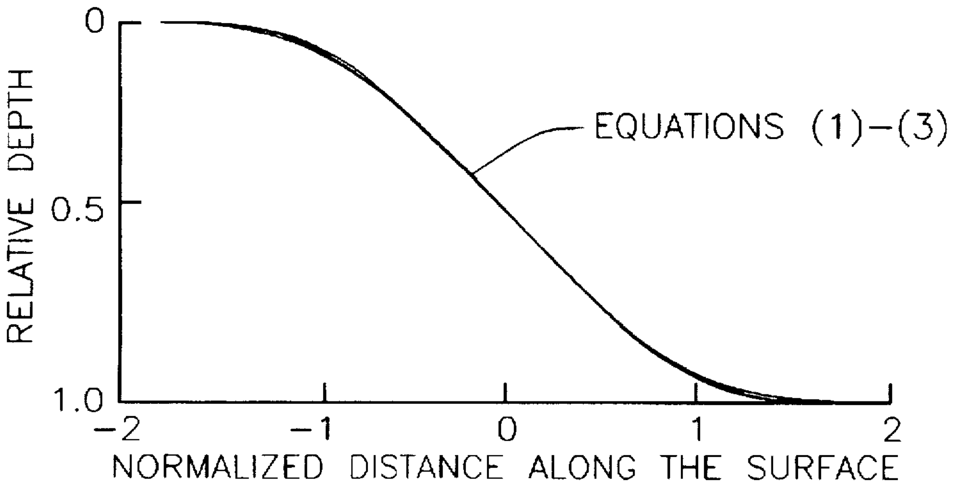
FIG. 16 depicts the etch contours of FIG. 16 when the contours are normalized to have the same slope in the centers of the etch contours.

Referring now to FIG. 16, the etch profiles of FIG. 15 have been normalized to have the same slope in the center of the partially shadowed region. When normalized in this manner, the three quite different ion profiles of EQS. (1), (2), and (3) show only very small differences in etch-contour shape. This means that the particular shape assumed for the angular distribution of the ions can be unimportant, as long as the corresponding distribution equation (e.g., EQ. (1), (2), or (3)) is given together with the half-amplitude half angle $\phi'_{1/2}$. That is, with just the assumed distribution equation and the half-amplitude half angle $\phi'_{1/2}$ obtained from the experimental etch profile and based on this equation, the original shape of the experimental etch profile can be reproduced quite closely.

The above-described insensitivity of etched profile to assumed angular distribution is a procedural insensitivity, and should not imply a measurement insensitivity. Given sufficient layers penetrated in the collection surface and careful enough measurement of the etch profile, the present invention can provide very accurate angular-distribution information.

For EQ. (1), the half-maximum half angle corresponds to the central fifty-six percent of the etch depth. For example, if nine layers have been penetrated and the center of the etch contour is located somewhere in the tenth layer, the total depth of penetration is 9.5±0.5 layers. The central fifty-six percent of this depth corresponds to the central 0.56×(9.5±0.5)=5.32±0.28 layers. Using the previous example of L equal to 14.3 mm and angles close to normal incidence, the width of the central 5.3 layers in the etch profile can be converted into a half-maximum half angle at the ratio of four degrees per mm of width. The uncertainty in the etch depth can be used to estimate the corresponding uncertainty in half-maximum half angle. Note that this uncertainty is reduced by increasing the number of layers penetrated, but the ease of counting layers decreases as this number increases. A number of layers penetrated between ten and twenty appears to be a reasonable compromise for many applications.

The calculation of half-maximum half angle would be similar for EQS. (2) and (3) except that the half-maximum half angle would correspond to the central fifty-five and fifty percent of etch depth, respectively. These percentages were obtained by numerical integration, but can also be approximately obtained from the shape of the curves shown in FIG. 15 (from the fraction of depth between $\gamma/\phi'_{1/2}=-0.5$ and $\gamma/\phi'_{1/2}=0.5$).

As a specific example of dimensions for the embodiment of the present invention shown in FIGS. 9 and 10, a distance of 14.3 mm was given for the distance from the aperture to the collection surface (L in FIG. 9). This distance gives a ratio of four degrees per millimeter of distance on the collection surface. An aperture diameter (D in FIG. 9) of twenty mm and a collection surface diameter of forty mm were also used. These dimensions were adequate for the use of the simplified model with a straight-edge mask for half-maximum half angles in the range of two to four degrees, which is a typical range for gridded ion sources at near optimum operating conditions. If larger half-maximum half angles were to be measured using the simplified model, a larger ratio of D/L would be required. With twenty layers of approximately six-hundred Angstroms each deposited on the circular substrate, an exposure of 7.4 minutes to 1 $mA/cm^2$ of 640 eV argon ions etched through thirteen layers. The half-maximum half angle in this experiment was 3.1 degrees with a probable error of ±0.2 degrees.

The use of the simplified model described in connection with FIG. 13 has been presented above, together with an experimental configuration used for reduction to practice. Having described the simplified model, it is now convenient to describe the more general model. With the ready availability of computers, a computer program can be written for configurations in which the width of the etch pattern in FIG. 11 approaches the mean diameter of that pattern D, which is also the hole diameter D in FIG. 9. The actual etch distribution can then be compared with several computer solutions to determine which combination of half-maximum half angle and angular distribution best fits experimental results. For this comparison of experimental results with computer solutions to be effective, it is only necessary to have the hole diameter D large enough to give an unshadowed region in the center of the etched pattern. The absence of a shadow in the center of the etched pattern can be determined in a number of ways, but a convenient and practical way is to make diameter D large enough so that there is a substantial central region of one color (silver in FIG. 11).

Such a computer model was written and, in its initial form, found to be practical in designs where the additional work can be justified by application advantages, such as more compact probe construction. Eventually, the spatial distribution of layer boundaries could be used with software to automatically compute the half-maximum half angle and the angular distribution. It should also be apparent that, in the near term, the use of a computer model is an excellent way to determine the practical limits on the use of the simplified theory.

There are several advantages of the present invention over the prior art. No electrical measurements are required, so there is no electrical shielding required in the adverse plasma environment of an ion beam. The configuration is rugged and capable of surviving operation at 200° to 3000° C. when within the ion beam. Perhaps most important, the etching capability of energetic neutrals is included in the angular distribution. In the prior-art devices that measure the angular distribution of energetic ions and then require correction for the contribution of energetic neutrals, it is implicitly assumed that the energetic neutrals have the same spatial and angular distributions as the energetic ions. This assumption may, or may not, be true. With the present invention, the combined angular distribution of energetic ions and neutrals is measured, and it is measured with an etching process similar to the normal etching of a target. In addition, the ion collection surface, after use, provides a permanent record of the angular distribution measurement.

It should be apparent to someone even moderately skilled in the art that many alternatives are possible in the configuration. For example, the configuration shown in FIGS. 9 and 10 is axisymmetric, except perhaps for mounting holes in the flange. A similar probe could be used with the supporting theory if the aperture and collection surface were square, or some other shape, as long as the requirements for the various dimensions were applied in an appropriate manner. In a similar manner, the collection surface could depart from flat to achieve particular objectives. The configuration shown in FIGS. 9 and 10 is simply the one that is felt to be most practical from a production and initial use viewpoint.

In a similar manner, the use has concentrated on axially symmetric angular distributions of a type typical over most of the beams of gridded ion sources. Other types of ion sources may require extensions of the theory to account for particular features of their angular distributions. Even restricting the application of this probe to gridded ion sources, it is known by those skilled in the art that the angular distribution of ions near the edge of the ion beam is not axially symmetric, and that different half-maximum half angles should be expected in the radial and circumferential directions at such a location.

At first glance, the etch profile behind an approximately straight-line mask may appear to be an indirect way to obtain the angular distribution. In fact, most etching applications with masks involve straight edges for those masks. Thus, although the angular distribution may be considered a more fundamental measurement from a theoretical viewpoint, the etch pattern behind a straight-edge mask is actually closer to more critical applications than the angular distribution.

The description of the preferred embodiment described in FIGS. 9 and 10 includes the use of alternate layers of metals with contrasting colors. Rather than using two metals, additional layers with additional contrasting metals, such as gold, could be used to give a more complex pattern that could, independently of the use of the top or bottom layer, define the location of a layer in the overall layered structure. In a similar manner, varying the thicknesses of the layers could be used to give a more complex pattern to achieve the same objective.

As a further example of alternate approaches that are within the scope of this invention, the alternate layers of metals with contrasting colors could be nickel and iron for which an oxidation step would be required to show a clear difference in color. Alternatively, the alternate layers of metals with contrasting colors could be replaced with alternate layers having differing electrical properties (such as different conductivities) and the visual measurement of etching depth replaced with electrical measurements of the etching depth. Such electrical measurements could be made during etching or, to reduce measurement difficulties, after the test has been completed and the probe and collection surface have been removed from the vacuum chamber.

Figure 17:
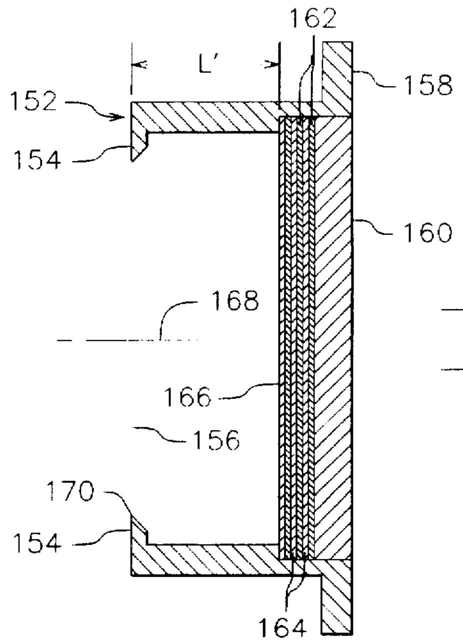
FIG. 17 is a schematic cross-sectional view of the angular-distribution probe constructed in accordance with one alternate embodiment of the present invention.

FIG. 17 sets forth an angular distribution probe 152 that is an alternate embodiment of the improvements of the present invention. Probe 152 is comprised of a body 154, which has a centrally located aperture 156, and a mounting flange 158; there also is a circular substrate 160 upon which have been deposited alternating layers of metals 162 and 164 contrasting in color. Layers 162 and 164 are microscopic in thickness, with layers 162 all the same size and layers 164 all the same size, and each is typically 200 to 1000 Angstroms in thickness.

Figure 18:
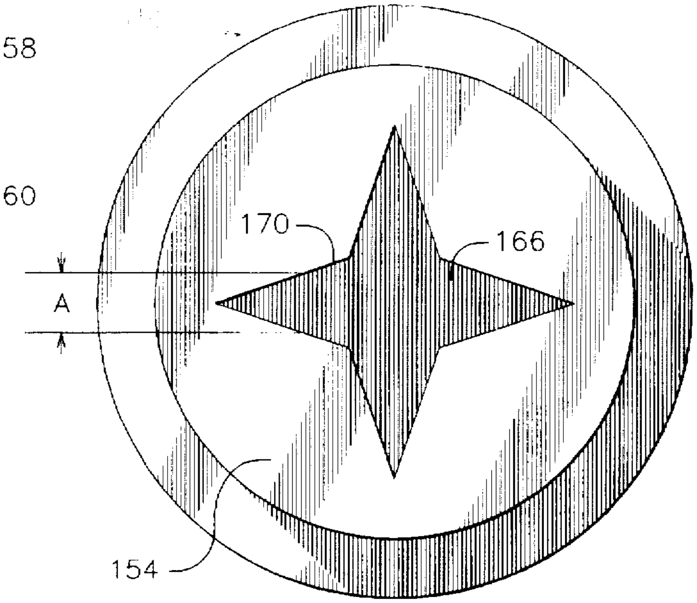
FIG. 18 is a plan view of the angular-distribution probe shown in FIG. 17 that shows the shape of the aperture.

Probe 152 in FIG. 17 is generally axisymmetric with an axis of symmetry 168. An exception to the axisymmetric shape is the aperture 156. The shape of aperture 156 is shown in FIG. 18 which shows probe 152 viewed from the direction from which the ions arrive (from the left in FIG. 17). When viewed from this direction, edge 170 of aperture 156 has the shape of a four-pointed star centered relative to probe 152. Each arm of the star has a width A that decreases from the center of the pattern to a tip.

Figure 19:
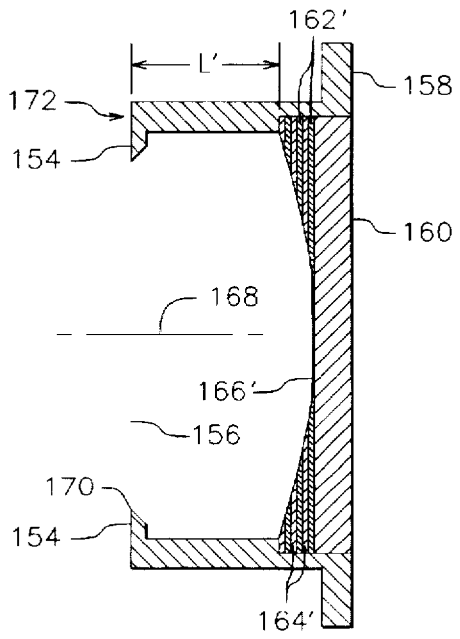
FIG. 19 is a schematic cross-sectional view of the angular-distribution probe shown in FIGS. 17 and 18 after exposure to energetic ions and neutrals.

FIG. 19 shows a probe 172, which is the same probe as shown in FIGS. 17 and 18, except that it has been exposed to energetic ions and neutrals. The energetic ions and neutrals move generally from left to right, striking surface 166' and causing the etching shown by comparing surface 166' with surface 166 in FIG. 17. The change in surface 166' corresponds to the removal of part or all of alternating layers 162' and 164'.

Figure 20:
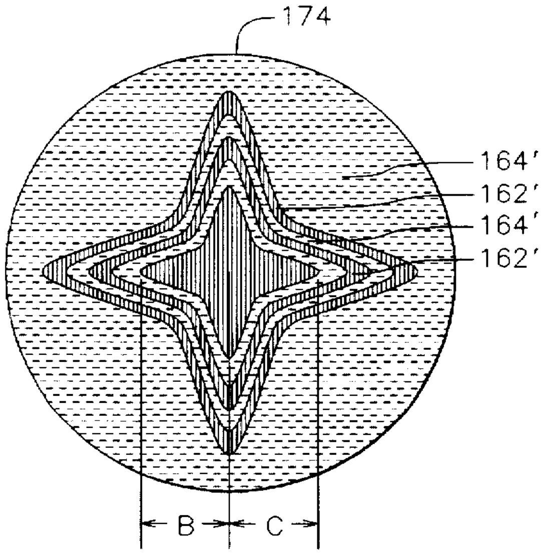
FIG. 20 is a plan view of the etched collection surface of the probe shown in FIG. 19.

In FIG. 20 is shown the outline 174 of the circular substrate 160 and the partially etched layers of contrasting metals 162' and 164' which are located upon the substrate, except the view is normal to the etched surface 166'. The etched layers 162' and 164' are, as mentioned above, extremely thin and therefore difficult to measure when viewed from the side. When the etched surface is viewed as shown in FIG. 20, the removal of layers is visible with the unaided eye or with low-power magnification.

The color pattern in FIG. 20 should have a shape similar to the star-shaped aperture 156. As was true for the embodiment described in FIGS. 9 through 11, the central region of one color (red for copper in FIG. 20) should be large enough to indicate an unshadowed region in the center of the etched pattern. More specifically, for the shape of the embodiment of FIGS. 17 through 19 the central region of one color should extend outward to correspond to locations somewhere in the four arms of the star-shaped aperture 156.

The displacement of the color pattern from the geometric center of the outside edge 174 shows the mean angular displacement of the angular distribution of the arriving energetic ions and neutrals from the axis of symmetry. A convenient way to calculate this displacement for the horizontal direction in FIG. 20 is to measure the maximum extent of the central color region in the two horizontal directions. These two measurements from the center of the circular shape 174 are shown as B and C in FIG. 20. The mean displacement of the central color region is then (B–C)/2. This mean displacement can be used together with distance L' in FIG. 17 to calculate the mean displacement of the arriving energetic ions and neutrals in a manner similar to the mean-displacement calculation made in connection with the embodiment shown in FIGS. 9 through 11. It should also be evident that the mean displacement in the vertical direction can be made using two additional measurements of the extent of the central color region in the vertical direction.

The measurement of angular distribution in the vertical direction can be made using the same measurements B and C in FIG. 20. First, the mean radial extent in the horizontal direction, (B+C)/2, is calculated. From the previously known shape of the aperture 156, the width A of an arm of that star-shaped aperture can be determined for the mean radial distance (B+C)/2. Referring to FIGS. 12 and 13, it should be evident that width A and length L' define an angle equal to twice the maximum half angle of the distribution. The half-maximum half angle can then be determined by assuming a shape for the angular distribution. For EQ. (1), the half-maximum half angle is thirty-five percent of the angle defined by A and L'. For EQS. (2) and (3) the half-maximum half angles are thirty-three and twenty-five percent, respectively.

The above description of calculating the half-maximum half angle is for the vertical direction in FIG. 20. A similar calculation for the horizontal direction can be made by using two additional measurements of the extent of the central color region in the vertical direction. Further, the calculation procedure description should only be considered exemplary in that other procedures using other fiducial points in the color pattern can be devised. As discussed previously in connection with FIGS. 15 and 16, the etch profile can be accurately reproduced from the measured half-maximum half angle as long as the specific equation used to define that angle is also specified.

Figure 21:
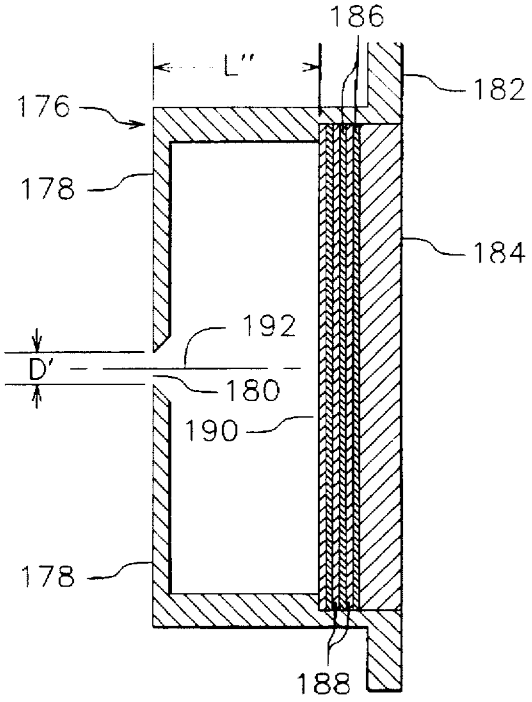
FIG. 21 is a schematic cross-sectional view of the angular-distribution probe constructed in accordance with another alternate embodiment of the present invention.

FIG. 21 sets forth an axisymmetric angular distribution probe 176 that is another alternate embodiment of the improvements of the present invention. Probe 176 is comprised of a body 178, which has a centrally located circular aperture 180, and a mounting flange 182; there also is a circular substrate 184 upon which have been deposited alternating layers of metals 186 and 188 contrasting in color. The diameter D' of the aperture 180 should be small compared to the distance L" from the aperture 180 to the ion collection surface 190, with the size relationship defined more precisely below. Layers 186 and 188 are microscopic in thickness, with layers 186 all the same size and layers 188 all the same size, and each is typically 200 to 1000 Angstroms in thickness. Probe 176 has an axis of symmetry 192.

Figure 22:
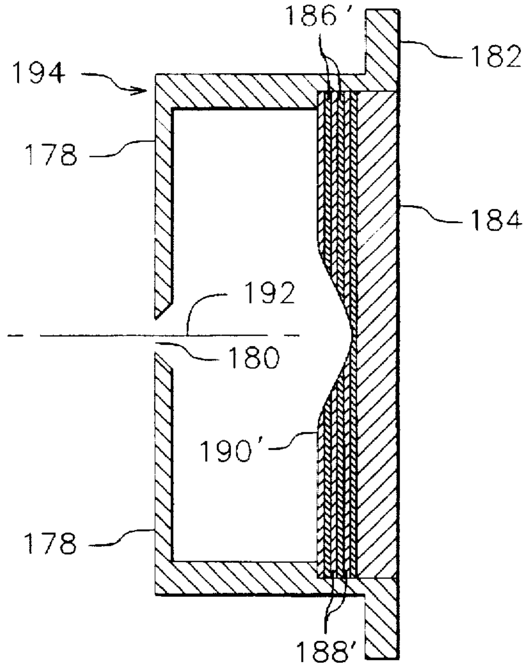
FIG. 22 is a schematic cross-sectional view of the angular-distribution probe shown in FIG. 21 after exposure to energetic ions and neutrals.

FIG. 22 shows a probe 194, which is the same probe as shown in FIG. 21, except that it has been exposed to energetic ions and neutrals. The energetic ions and neutrals move generally from left to right, striking surface 190' and causing the etching shown by comparing surface 190' with surface 190 in FIG. 21. The change in surface 190' corresponds to the removal of part or all of alternating layers 186' and 188'.

Figure 23:
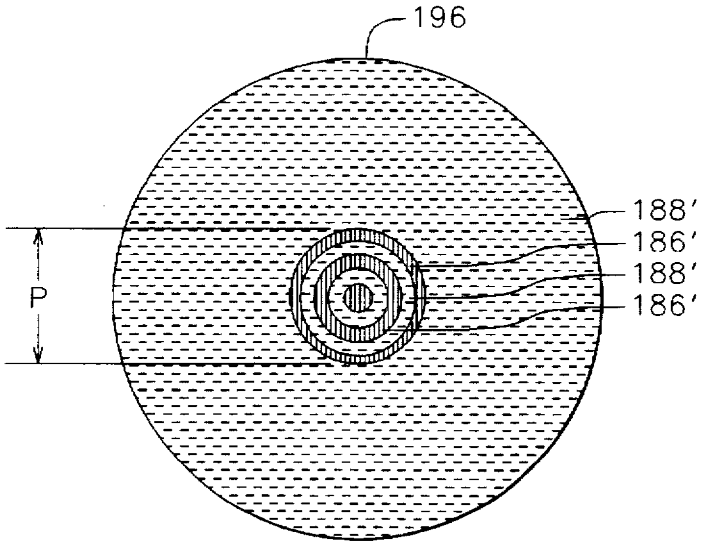
FIG. 23 is a plan view of the etched collection surface of the probe shown in FIG. 22.

In FIG. 23 is shown the outline 196 of the circular substrate 184 and the partially etched layers of contrasting metals 186' and 188' which are located upon the substrate, except the view is normal to the etched surface 190'. The etched layers 186' and 188' are, as mentioned above, extremely thin and therefore difficult to measure when viewed from the side. When the etched surface is viewed as shown in FIG. 23, the removal of layers is visible with the unaided eye or with low-power magnification.

The interpretation of the color pattern in FIG. 23 is fairly direct. The displacement of the center of the color pattern from the geometric center of the outside edge 196 shows the mean angular displacement of the angular distribution of the arriving energetic ions and neutrals from the axis of symmetry.

The angular distribution of the energetic ions and neutrals can be obtained directly from the radial variation in etch depth shown in FIG. 23. Again assuming small angles, so that the distance on the etched surface in FIG. 23 is proportional to the angle, the radial distance from the center of the color pattern in FIG. 23 can be plotted against the number of layers penetrated to directly give the experimental angular distribution, equivalent to the theoretical ones given in FIG. 12. The accuracy of this distribution is dependent on the diameter P of the color pattern in FIG. 23 relative to the diameter D' of the circular aperture 180 shown in FIG. 21. For reasonable resolution of the angular distribution, D' should be about 1/10 of P. This relationship between D' and P would result in the mean etch rate of the surface within the diameter P being about 0.01 times the etch rate of an unprotected surface. In other words, with similar layer thicknesses, the required exposure time for the probe increases greatly as the diameter D' is decreased and the resolution increased. (This is in addition to the limit on resolution imposed by the finite number of layers penetrated.) Comparing to the specific configuration and test conditions used for the embodiment of this invention shown in FIGS. 9 through 11, and assuming an average etch depth of only six or seven layers, the requirement for the pattern diameter P to be ten times the aperture diameter D' results in a required exposure time of about fifty times as long as that embodiment, or about six hours for the conditions given there. This time could be reduced to about two hours by reducing the layer thickness to near the minimum required to avoid mixing between layers during exposure, which is about 200 Angstroms. Even so, this is a long exposure time. In those cases where the angular distribution, itself, is of prime interest, rather than the etch pattern behind a straight-line mask, however, the configuration of FIGS. 21 through 22 may be preferable to that of FIGS. 9 through 11.

As with the previous configurations, that of FIGS. 21 through 23 is subject to variations. One of the most obvious is to make the collection surface a segment of a sphere, with the aperture located at the center of the sphere. Such a configuration would permit the measurement of large angular distributions without geometrical corrections.

It should be noted that the etch rate of the central region of the embodiment shown in FIGS. 9 through 11 is equal to the etch rate of an unprotected surface—in fact, the absence of shadow for the central region was a condition for the use of that configuration. To use the embodiment of FIGS. 9 through 11, one can estimate how many layers will be penetrated from the ion energy and current density, which are usually known beforehand. To estimate how many layers will be penetrated using the embodiment of FIGS. 21 through 23, however, it is also necessary to know the angular distribution of ions, which is usually not known because the probe is being used to determine this distribution.

There is a further shortcoming of the alternate embodiment shown in FIGS. 21 through 23. A frequent use of ion beams is to etch features in devices using masks with many approximately straight-line edges. In the alternate embodiment, the angular distribution must be used to calculate the etch contour that would be generated by a mask with a straight-line edge. For the embodiment shown in FIGS. 9 through 10, assuming that D is large compared to W, the etch contour of a mask with a straight-line edge is given more directly. That is, the first embodiment gives information in a form closer to that which is frequently needed.

For the embodiments illustrated, the multilayer surface is supported by an underlying substrate. Although not as convenient because the films are so thin, an alternative is to support the films from the edge.

Of key significance to the operation is the combination of the multilayer surface with a mask having an aperture. Although not always necessary, the usual overall assembly will have that mask carried within or as part of an enclosure. Moreover, the entire probe assembly will be located within an evacuated chamber.

While particular embodiments of the present invention have been shown and described, and various alternatives have been suggested, it will be obvious to those of ordinary skill in the art that changes and modifications may be made without departing from the invention in its broadest aspects. Therefore, the aim in the appended claims is to cover all such changes and modifications as fall within the true spirit and scope of that which is patentable.

We claim:

1. For use in analyzing the angular distribution of a plurality of energetic molecules, either ionized or neutral, moving along a predetermined path, an angular distribution probe comprising:

a multilayer surface disposed transversely across said path in a position to intercept said molecules and said molecules being sufficiently energetic to removingly etch the materials in said layers;

a mask disposed across said path in a position to protect said layers from said molecules;

and an aperture in said mask for controlling the passage of said molecules along said path through said mask and onto said surface in the creation of an etched pattern.

2. An angular distribution probe as defined in claim 1 in which the diameter of said aperture is sufficiently large to yield an unshadowed region in said etched pattern.

3. An angular distribution probe as defined in claim 1 in which the distance from said mask to said surface is sufficiently small that the width of that part of said etch pattern that contains the bulk of variation in etch depth is small compared to the diameter of said aperture.

4. An angular distribution probe as defined in claim 3 in which the characteristic dimension of said aperture is at least ten times the width of that part of said pattern that contains the bulk of variation in etch depth.

5. An angular distribution probe as defined in claim 1 in which said multilayer surface is composed of a plurality of metal layers individually having respective different colors.

6. An angular distribution probe as defined in claim 1 in which said multilayer surface is composed of different layers individually having respective different conductivities.

7. An angular distribution probe as defined in claim 1 in which said multilayer surface is substantially planar and in which said aperture lies in a plane parallel to said surface.

8. An angular distribution probe as defined in claim 1 in which said aperture is sufficiently small that the size of said etch pattern is large compared to the characteristic dimension of said aperture.

9. An angular distribution probe as defined in claim 1 in which the materials of which said surface is composed are selected to enable the capability of exhibiting the combined distribution of both ionized and neutral energetic molecules.

10. An angular distribution probe as defined in claim 1 in which the materials of which said surface is composed are of a nature to serve subsequently as a permanent record of said angular distribution.

11. An angular distribution probe as defined in claim 1 in which said aperture is axisymmetric with respect to said path.

12. An angular distribution probe as defined in claim 1 in which said aperture non-axisymmetric with repect to said path.

* * * * *